(12) United States Patent
Agnihotri et al.

(10) Patent No.: US 8,863,202 B2
(45) Date of Patent: Oct. 14, 2014

(54) SYSTEM AND METHOD FOR VOICE DRIVEN CROSS SERVICE SEARCH USING SECOND DISPLAY

(75) Inventors: Davender Agnihotri, Murrieta, CA (US); Sandeep Krishna, San Diego, CA (US); Chunlan Yao, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 0 days.

(21) Appl. No.: 13/428,583

(22) Filed: Mar. 23, 2012

(65) Prior Publication Data

US 2013/0125168 A1 May 16, 2013

Related U.S. Application Data

(60) Provisional application No. 61/558,697, filed on Nov. 11, 2011.

(51) Int. Cl.
| | |
|---|---|
| H04N 7/18 | (2006.01) |
| H04N 21/41 | (2011.01) |
| G10L 15/22 | (2006.01) |
| H04N 21/482 | (2011.01) |

(52) U.S. Cl.
CPC ............ *G10L 15/22* (2013.01); *H04N 21/4126* (2013.01); *H04N 21/4828* (2013.01)
USPC ................. 725/82; 725/109; 725/153; 725/53

(58) Field of Classification Search
CPC ............ H04N 21/222; H04N 21/2343; H04N 21/23614; H04N 21/2387; H04N 21/25; H04N 21/25825; H04N 21/25833; H04N 21/25816; G10L 15/26; G10L 15/265
USPC ......... 725/43, 51, 87, 104; 348/734; 704/246; 381/110
See application file for complete search history.

(56) References Cited

U.S. PATENT DOCUMENTS

| | | | | |
|---|---|---|---|---|
| 5,226,090 A | * | 7/1993 | Kimura | 381/110 |
| 5,583,864 A | * | 12/1996 | Lightfoot et al. | 370/396 |
| 5,880,720 A | * | 3/1999 | Iwafune et al. | 725/24 |
| 5,982,445 A | * | 11/1999 | Eyer et al. | 348/461 |
| 6,097,441 A | * | 8/2000 | Allport | 348/552 |

(Continued)

FOREIGN PATENT DOCUMENTS

WO 0197211 A1 12/2001

OTHER PUBLICATIONS

Nicholas Weil, Synchronized Second-Screen technologies panorama. Nov. 15, 2011. http://blog.eltrovemo.com/529/synchronized-secon-screen-technologies-panorama.

*Primary Examiner* — Pankaj Kumar
*Assistant Examiner* — Timothy Newlin
(74) *Attorney, Agent, or Firm* — Mark D. Wieczorek; Mayer & Williams PC (57) ABSTRACT

Apparatus and methods to implement a technique for using a second display with a network-enabled television. In one implementation, this feature allows the user to conveniently enter search terms and other commands for control of their IPTV device directly from a second display device using voice commands. Such is particularly convenient when the second display is a device such as a smart phone or tablet computer with limited display space for user data entry.

22 Claims, 7 Drawing Sheets

(56) References Cited

U.S. PATENT DOCUMENTS

| | | | | |
|---|---|---|---|---|
| 6,104,334 A * | 8/2000 | Allport | | 341/175 |
| 7,477,909 B2 * | 1/2009 | Roth | | 455/466 |
| 7,552,327 B2 * | 6/2009 | Halcrow et al. | | 713/165 |
| 7,756,550 B2 * | 7/2010 | Piekarz | | 455/569.1 |
| 7,814,022 B2 | 10/2010 | Gupte | | 705/59 |
| 2001/0039659 A1 * | 11/2001 | Simmons et al. | | 725/61 |
| 2002/0157107 A1 | 10/2002 | Kitsukawa et al. | | |
| 2003/0139933 A1 * | 7/2003 | Kimmel | | 704/275 |
| 2003/0172001 A1 * | 9/2003 | Yasuda et al. | | 705/26 |
| 2003/0226147 A1 | 12/2003 | Richmond et al. | | |
| 2004/0060059 A1 * | 3/2004 | Cohen | | 725/30 |
| 2010/0105364 A1 * | 4/2010 | Yang | | 455/414.1 |
| 2010/0254370 A1 * | 10/2010 | Jana et al. | | 370/352 |
| 2011/0060592 A1 * | 3/2011 | Kang et al. | | 704/275 |
| 2011/0265118 A1 | 10/2011 | Choi et al. | | |
| 2012/0151525 A1 * | 6/2012 | Demchenko et al. | | 725/39 |

* cited by examiner

SYSTEM AND METHOD FOR VOICE DRIVEN CROSS SERVICE SEARCH USING SECOND DISPLAY

CROSS-REFERENCE TO RELATED APPLICATIONS

This application claims benefit of priority of U.S. Provisional Patent Application Ser. No. 61/558,697, filed Nov. 11, 2011, entitled "VOICE DRIVEN CROSS SERVICE SEARCH FOR IPTV USING $2^{ND}$ DISPLAY", owned by the assignee of the present invention and herein incorporated by reference in its entirety. Also incorporated by reference in its entirety is co-owned U.S. patent application Ser. No. 12/982,463, filed Dec. 30, 2010, entitled "DEVICE REGISTRATION PROCESS FROM SECOND DISPLAY".

BACKGROUND

Internet delivery of digital content to IPTVs continues to increase, as does the popularity of IPTVs themselves. Consuming such content typically involves browsing, searching, or otherwise indicating on a user interface terms employed in browsing or searching. Where a user interface is large, e.g., on a laptop, such indications are not difficult. However, where the user interface is a hand-held device, such as a small phone or tablet computer, or a TV remote control, such indications become significant more difficult to enter. In addition, the virtual keyboards presented on such devices are generally not conducive to typing since true calibration is difficult to achieve.

SUMMARY

Systems and methods are disclosed to implement techniques for searching using voice commands. In implementations according to principles disclosed here, a second display device acts as a voice input device to perform cross service searches using voice commands on or in conjunction with a primary display device, e.g., a content playback device such as an IPTV. In other implementations, the voice input device need not be a second display device, and can rather be another device that has network capability and a microphone for voice input, such as a content playback device, Blu-Ray® disc player, or universal remote.

In one aspect, the invention is directed towards a method of performing a function relating to media content for playback on a content playback device using a second display, including: establishing a session between a proxy server and a second display, the session associated with a user account, the second display further having at least one content playback device associated therewith; receiving audio data at the server, the audio data indicating at least a portion of a function to be performed by the server; converting the audio data to textual data; using the textual data to perform the function; and transmitting a set of results of the performing of the function to the second display or to the content playback device associated with the second display.

Implementations of the invention may include one or more of the following. The function may be a search function, and the set of results may include search results. The converting may be performed by a voice-to-text engine. The method may further include receiving a selection of a result from the set, and may further include receiving an authentication credential from the content playback device, and may further include causing the playback of the selection on the content playback device. The method may further include affiliating the user account and content playback device with a service provider, the affiliating including transmitting to the service provider at least one user account identifier and the authentication credential. The method may further include affiliating the user account and content playback device with a plurality of service providers, the affiliating including transmitting to each of the service providers at least one user account identifier and the authentication credential, and the using the textual data to perform the function may further using the textual data to perform a search on each of the service providers. The method may further include selecting the content playback device for browsing content items from a service provider through a proxy server. The content playback device may be an IPTV, an audio system, or a digital video recorder. The second display may be a tablet computer, a smart phone, a laptop computer, a desktop computer, an internet appliance, or a computing device with internet access.

In another aspect, the invention is directed towards a non-transitory computer-readable medium, including instructions for causing a computing device to implement the above method.

In a further aspect, the invention is directed towards a method of performing a function relating to media content for playback on a content playback device using a second display, including: establishing a session between a second display and a proxy server, the session associated with a user account; receiving audio data at the second display, the audio data indicating at least a portion of a function to be performed by a server; converting the audio data to textual data at the second display; transmitting the textual data to the proxy server; and receiving a set of results of the function at the second display or at a content playback device associated with the second display.

Implementations of the invention may include one or more of the following the function may be a search function, and the set of results includes search results. The function may be a command prompt, and the set of results may include results of the command. The method may further include transmitting a selection of a result from the set to the server. The method may further include receiving at least a portion of a content item corresponding to the result for playback on the second display. The method may further transmitting an authentication credential of the content playback device to the server, and receiving at least a portion of a content item corresponding to the result for playback on the content playback device. The method may further include affiliating the user account and content playback device with a service provider, the affiliating including transmitting to the service provider at least one user account identifier and the authentication credential. The second display may be a smart phone, and the receiving audio data at the second display may include receiving audio data using an internal microphone of the smart phone. The second display may be a smart phone, and the receiving audio data at the second display may include receiving audio data using an external microphone in data communication with the smart phone.

In another aspect, the invention is directed towards a non-transitory computer-readable medium, including instructions for causing a computing device to implement the above method.

Where second displays are employed, the same serve as a visual aid to the IPTV, but generally do not require additional investment by the user because the same make use of a device, e.g., a smartphone, tablet computer, or the like, which most users would already have in their possession. Such a second display is a perfect complement to an IPTV because of the second display's strength in various aspects, including those directly related to voice input, including supported languages and character font sets, data entry, processing power, and user experience in content management. The second displays may include any device that can run an application that communicates with a content playback device, including, but not limited to, smart phones, personal computers, laptop computers, notebook computers, netbook computers, handheld computers, personal digital assistants, mobile phones, tablet computers, hand-held gaming devices, gaming consoles, and also on devices specifically designed for these purposes, in which case the special device would include at least a processor and sufficient resources and networking capability to run the web application.

The application running on the second display, which may accept voice inputs, may be a web application (scripting or non-scripting), a native application, a Java application, or any other sort of application that may communicate with a server. For example, the ASP/.NET framework with RPC can be employed to write the second display application. Where the web application running on the second display is written in HTML or HTML with JavaScript, the same may be loaded by any device with a browser, and so the same is not limited to only a small set of compatible devices or expensive remote controls. Where a smartphone is employed, a mobile version of audio input software may be employed, with an appropriate listing of fields and an appropriate mobile resolution.

Communications with service providers may take place through a proxy server, and the proxy server presents to service providers the authentication credentials of the content playback device, so that the second display appears to the service providers as an authenticated content playback device.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). Details of the services and their selection process are provided in the patent applications incorporated by reference above. However, it is noted here that a user may select one or more services to search or browse, and the input of search terms or other such selections may take place using voice input. This searching may occur across the various services or within a single service. Once a particular content item is selected, access may be made to the service for playback.

In many cases, access to a service requires becoming affiliated with the service. Affiliation in turn requires certain user account information as well as, in some cases, the authentication credentials of the content playback device. In most cases, the content playback device must be affiliated with services prior to browsing and searching following which the user may choose which service they wish to browse. For cases where a content playback device has not been chosen, the user may still choose services and search, using, e.g., voice input, but the content offerings may be less specific to a given content playback device. In general, making choices specific to a given content playback device is desirable as it enhances the user's overall experience, especially where screen size is at a premium, such as on a mobile device.

In certain implementations, the system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

A proxy server may be employed that includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can use voice input to enter a selection to command the content playback device to search for and playback selections.

Advantages of certain embodiments of the invention may include one or more of the following. Voice inputs may be employed to receive voice commands. Voice inputs associated with the second display may be employed to control or operate a primary device such as a content playback device. Searches and other functions may be performed in response to voice commands and data. Using the systems and methods disclosed, user input is made more convenient than typing in search terms on a small phone or tablet device. The systems and methods can be easily extended, with minor hardware variations, to televisions, BDs, or universal remotes.

Other advantages will be apparent from the description that follows, including the figures and claims.

BRIEF DESCRIPTION OF THE DRAWINGS

Like reference numerals denote like elements throughout.

Like reference numerals refer to like elements throughout.

DETAILED DESCRIPTION

Figure 1:
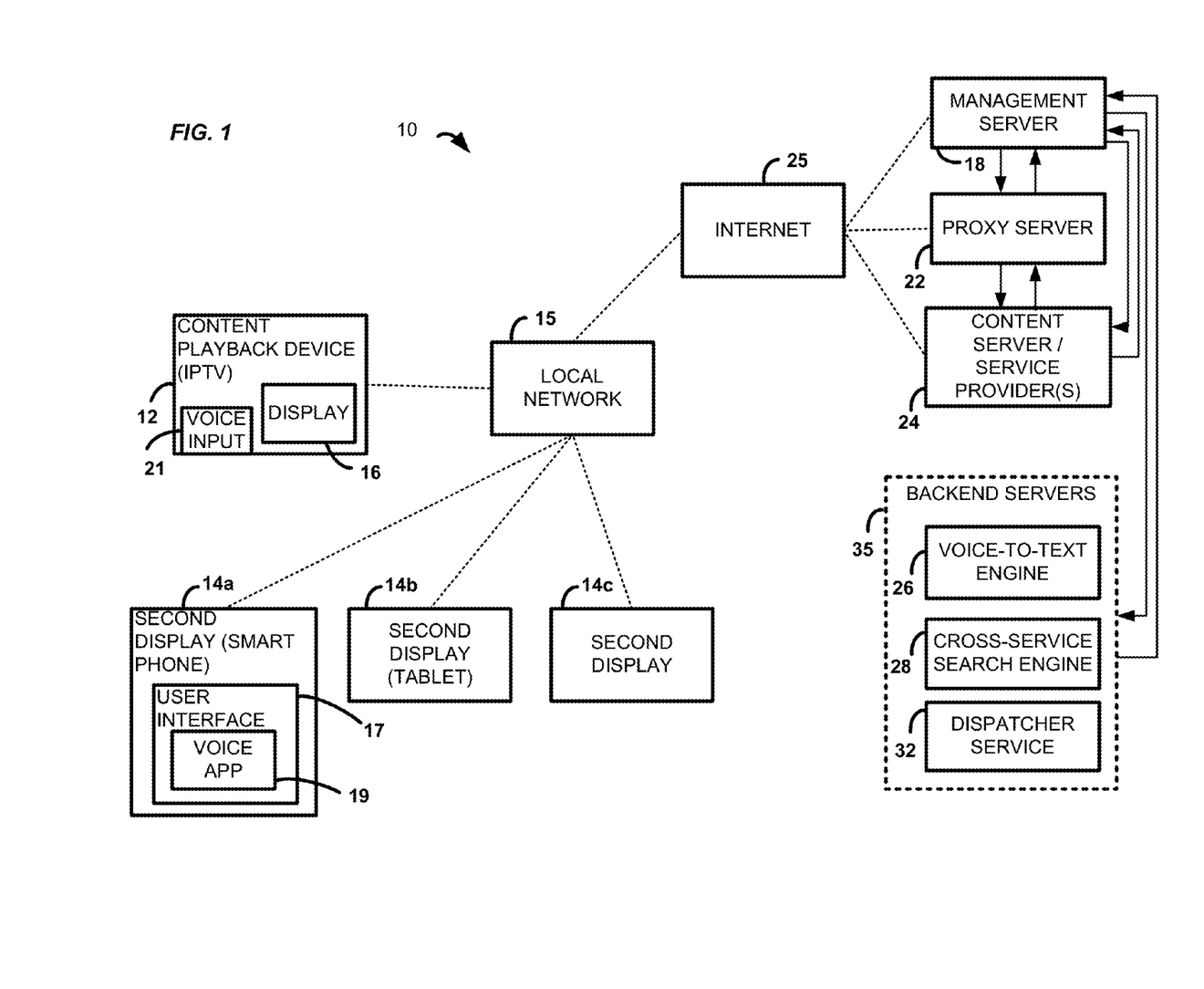
FIG. 1 is a block diagram of an exemplary system in accordance with an aspect of the present principles.

Referring initially to FIG. 1, a system 10 is shown including a content playback device 12 with display 16 which is coupled to a local network 15, which may be wired, wireless, or a combination of both. Also coupled to the local network 15 are one or more second displays 14a-14c, an exemplary one of which is termed herein second display 14i. The second display 14a is illustrated as a smart phone, the second display 14b is illustrated as a tablet computer; other types of second displays will also be understood.

A number of servers may be accessed by the content playback device 12 and the second display 14i through the local network 15 and the internet 25, including a management server 18, a proxy server 22, and one or more content servers 24 (only one is shown) corresponding to service providers. The function of the servers 18, 22, and 24 are described above, as well as in the applications incorporated by reference, and also to a certain extent in the description below.

Referring to FIG. 1, the second display 14a includes a user interface 17 on which a user may access a menu that includes a voice input application 19. Using the voice input application 19, the user can enter voice data to control certain functionality of the servers and service providers. It will be understood that the voice input application can be integrated with the second display application through which content items are directed to be played back on the content playback device, or the voice input application may be a separate application that receives and passes data to the second display application for subsequent transmission to the management server infrastructure. In still other implementations, the voice input application may run separately from the second display application, but still trans commands and data to the management server infrastructure on its own, the results of which are then presented within the second display application or on the content playback device, as appropriate.

In the system of FIG. 1, the second display 14a may operate as a voice input device to perform operations on or with a primary device, such as the content playback device 12, through the servers 18, 22, 24, and 35. In one implementation, the second display 14a sends received audio, e.g., voice, to the one or more servers and the same convert the audio to commands. The servers then perform the commanded functionality, either as commands or data, e.g., search terms, and return the results of the commands for search terms to the second display or to the content playback device, as appropriate. In another implementation, the server performs operations or sends requests to other network resources in response to the commands. The server then sends results back to the second display or to the content playback device as appropriate for presentation and interaction with the user.

Certain backend servers 35 may be employed, although it will be understood that the functions of the backend servers may be incorporated into those of the management server, proxy server, or even a service provider in some cases. The backend servers 35 include a voice-to-text engine 26 that converts the received audio voice sample to text, e.g., as data to be operated on, or to a command. The backend servers 35 may further include a search engine 28, which may be configured to search a single service or may search several services, e.g., providing a cross-service search function. The backend servers 35 may also include a server that operates a dispatcher service, which is responsible for receiving the audio data and returning results, e.g., search results.

It is noted that besides employing the functionality of the second display, in some implementations the content playback device 12 may receive audio data directly and transmit the same to the servers 18, 22, and 24, as well as to the backend servers 35. In FIG. 1, such functionality is afforded by way of voice input 21. The voice input 21 generally involves the use of a separate microphone coupled to the content playback device.

Figure 2:
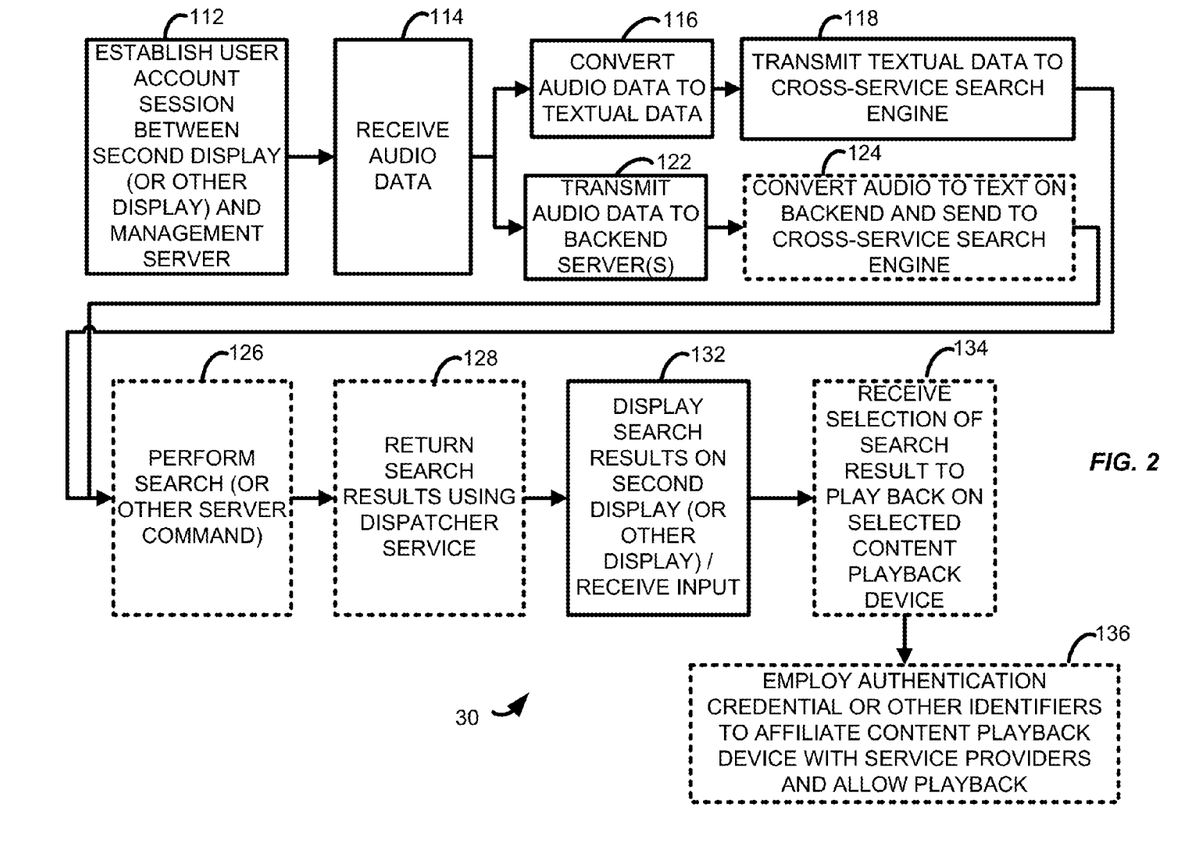
FIG. 2 is a flowchart illustrating an exemplary method according to another aspect of the present principles.

Referring next to the flowchart 30 of FIG. 2, in which solid boxes indicate steps generally performed by the second display and dotted boxes indicate steps generally performed by a server, a first step is the establishment of a user account session between a second display and a server, such as the management server (step 112). The user account usually has one or more content playback devices associated with the same. The second display device, e.g., a smart phone, tablet, or the like, may act as a proxy for the main device. In this way, the user with the second display device can receive, view, and search through the service list of the main device and then select and play IPTV content on the main device, directed by the second display device. While not generally required in all implementations, the establishment of the user account session is common in many arrangements. Moreover, it is noted that while communications are discussed as between a second display and a management server, in many cases such communications will occur through a proxy server, the functions of which are described above.

In a next step, the second display device receives audio data (step 114), the audio data used to perform functions and searching on the servers. The user may enter search terms or functions or commands to be performed using the second display's built-in microphone, if such is provided. Alternatively, external microphones may also be employed which are coupled to the second display. The second display then employs an application to transmit the audio data to a management server, which either converts the audio data to textual data or forwards the audio data to a backend server to perform such steps.

The way in which such steps are performed may vary. In one implementation, the audio data is converted to textual data at the second display (step 116). The textual data is then transmitted to a search engine for searching or to another such server for performance of a command (step 118). This implementation may be particularly appropriate for cases in which bandwidth is small and thus transmission of an audio file would be difficult.

In a different implementation, the audio data is transmitted to the management server and then to subsequent backend servers if necessary (step 122). The audio is converted to textual data on the backend and sent to the search engine or other server for performance of an indicated function (step 124). For example, the backend server may include a voiceto-text engine that converts the received voice sample to textual data or to a command. The backend server may also include a search engine. The voice engine then sends the converted text to the search engine, which compares the converted text to terms in a database, matching terms as appropriate and thus performing the search.

In either implementation, the search is performed, or the indicated function or command is performed (step 126). In the case of the search engine, search results are generated. The results are returned, e.g., using the dispatcher service (step 128). The results may be displayed on the second display or on another display, e.g., the content playback device (step 132). In some cases, input may then be received of a selection of one of the results. The server may receive the selection of the search result, and the same may then be caused to be played back on the selected content playback device, or on the second display if such is configured (step 134). In many cases, an authentication credential may be employed of the content playback device, or other such identifier, to affiliate the content playback device with service providers (step 136) and allow the same to playback content.

Using this system 10 of FIG. 1, the convenient and flexible user interface 17 of the second display 14*a* may be leveraged to provide a superior search in command experience for the user, particularly when voice input is combined with the small screen size of a mobile device or tablet.

Aspects of various components are described below.

Figure 3:
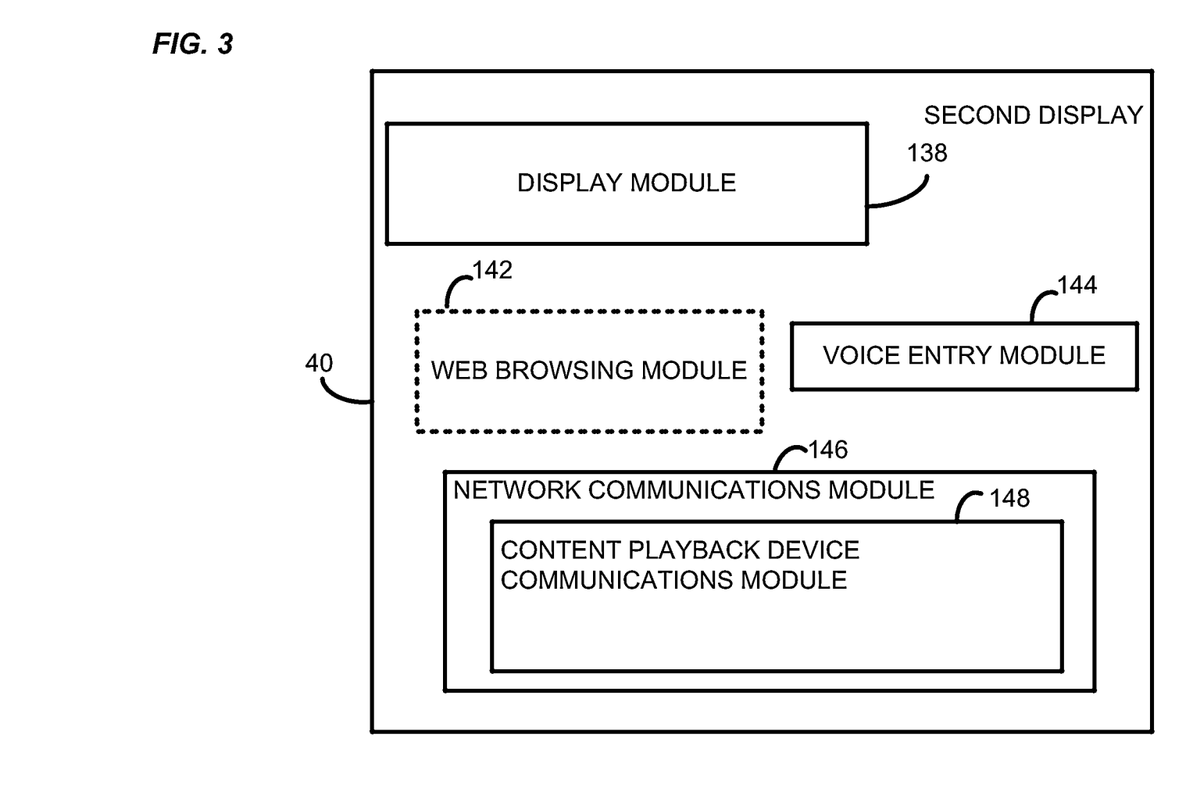
FIG. 3 is a block diagram of an exemplary second display system in accordance with another aspect of the present principles.

FIG. 3 illustrates one implementation of a second display 40. The second display 40 includes a display module 138 for use in, among other aspects, viewing menu options and fields in which data may be entered using voice entry. The display module 138 may also be employed in browsing lists and selecting items related to the content playback device. For example, a list of content playback devices accessible to the local network and/or addressable by the second display may be displayed using the display module 138, and the user may choose a content playback device from among the list. In addition to choosing a content playback device, or instead of, a user may review a list of accessible service providers using the display module 138. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 138 may display not just content accessible to the local network, but also content resident on the local network, such as content stored on a digital video recorder or Blu-Ray® player.

Also within the second display 14 may be an optional web-browsing module 142 through which the above-noted content items may be browsed in the case where the second display application is written in HTML and JavaScript. The web-browsing module 142 may be implemented in a number of ways, including in HTML, JavaScript, or the like. A web-browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 142 may be replaced with a suitable other module allowing service and content selection or other such functionality.

The second display 40 also includes a module for network communications 146. The network communications module 146 allows the second display to communicate with the local network as well as, in some cases, specific devices directly. As part of the network communications module 146, a communications module 148 for communications with a content playback device is provided. The content playback device communications module 148 allows the second display to communicate with the content playback device either over the local network, via the internet, or directly. Such direct communications may include various types of wired or wireless transmission schemes, including Wi-Fi, USB, infrared, Bluetooth®, or the like. The second display 40 may further include a voice entry module 144. The voice entry module 144 performs many of the steps noted above, including receiving and transmitting voice data, in some cases performing a step of voice recognition, and the like.

It is noted that the above modules may be implemented in hardware, non-transitory software, or a combination of the above. Typically, the same will be implemented within the context of a smart phone, a tablet computer, or the like.

Figure 4:
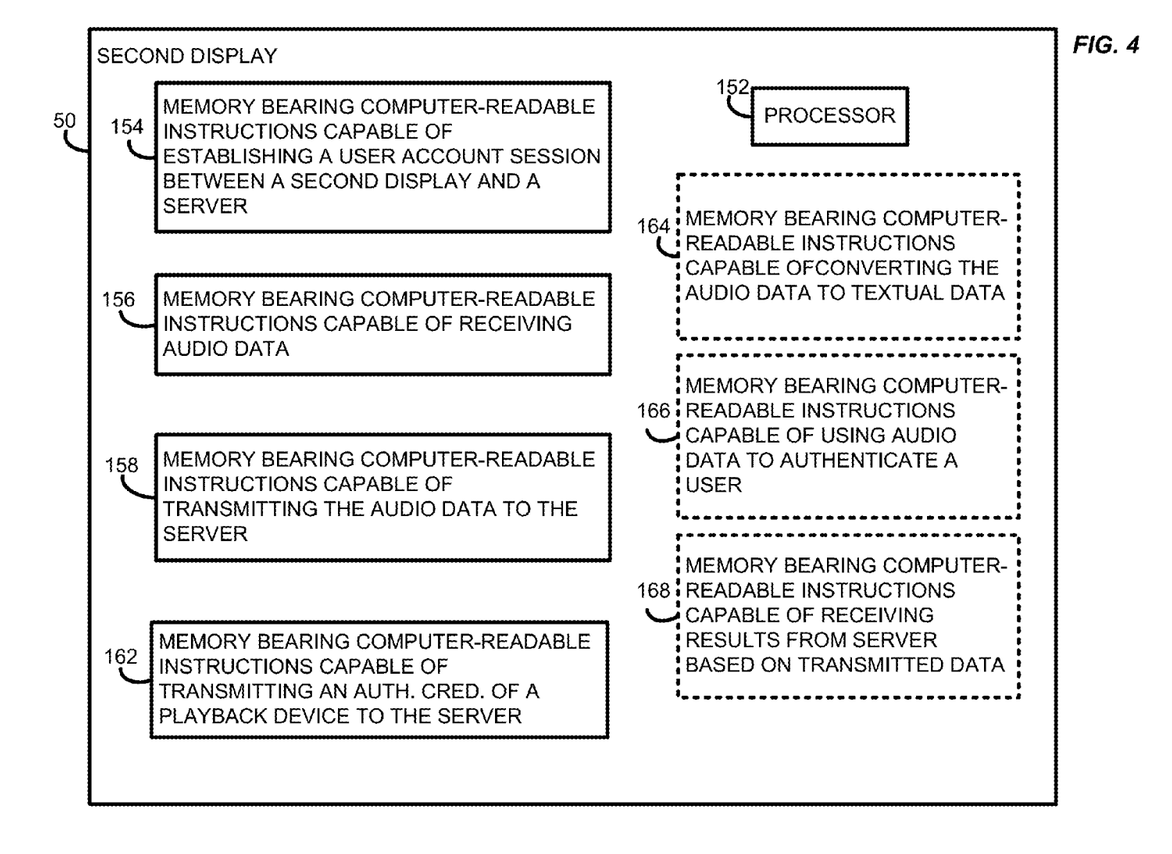
FIG. 4 is a block diagram of another exemplary second display system in accordance with an aspect of the present principles.
Figure 5:
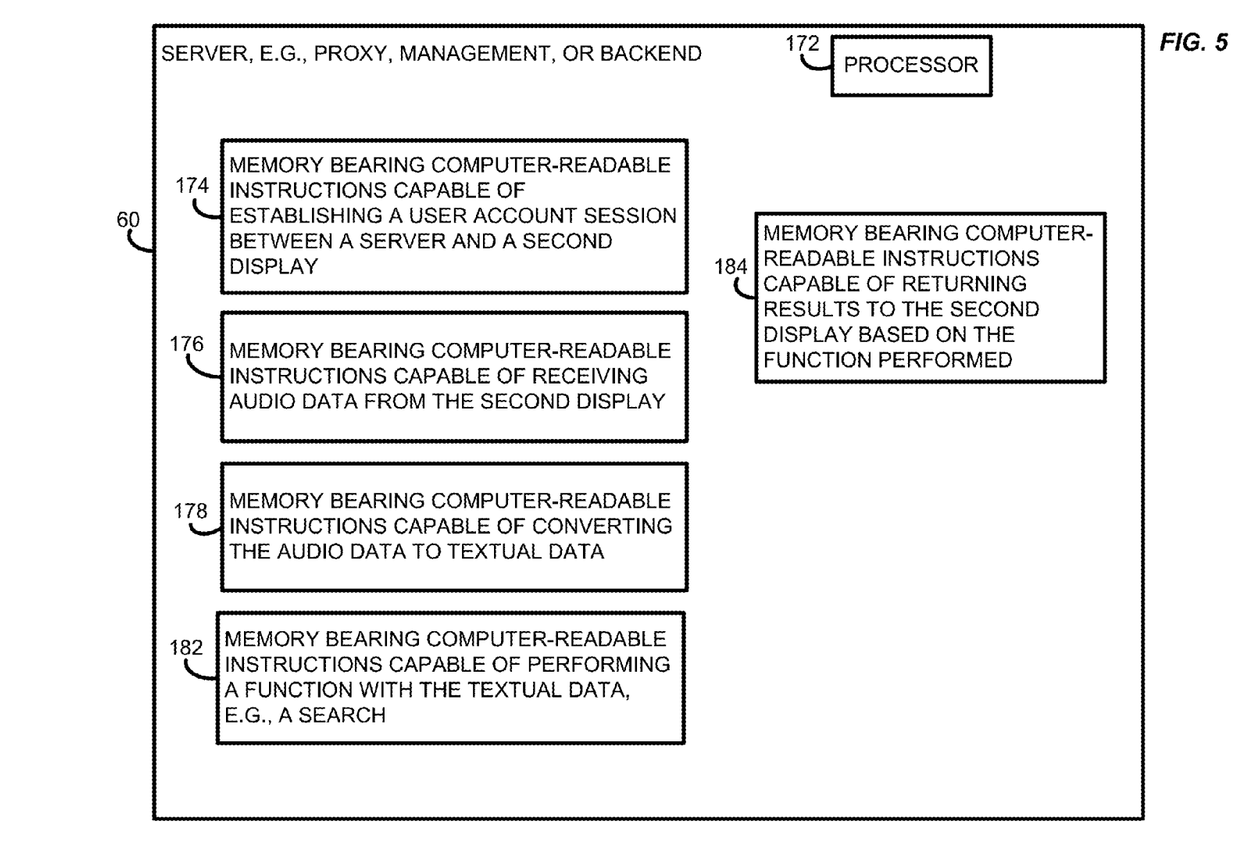
FIG. 5 is a block diagram of an exemplary server in accordance with another aspect of the present principles.

Referring to FIG. 4, another implementation of a second display 50 is illustrated. In this implementation, the second display includes a processor 152 as well as memory 154 bearing computer-readable instructions capable of establishing a user account session between a second display and a server, such as a management server or proxy server. The second display 50 further includes memory 156 bearing computer-readable instructions capable of receiving audio data, e.g., from a internal or external microphone. The second display 50 further includes memory 158 bearing computer-readable instructions capable of transmitting the audio data to the server, e.g., generally over a local network and the Internet. The second display 50 further includes memory 162 bearing computer-readable instructions capable of transmitting an authentication credential of a content playback device to the server. In this way, the content playback device can become capable of playing back the selections made by the second display.

Various optional memories are now described. The second display 50 further includes memory 164 bearing computer-readable instructions capable of converting the audio data to textual data. The second display 50 may further include memory 166 bearing computer-readable instructions capable of using the audio data to authenticate or otherwise identify a user, e.g., using voiceprint analysis. The second display 50 may further include memory 160 bearing computer-readable instructions capable of receiving results from the server based on the transmitted audio or textual data.

Figure 6:
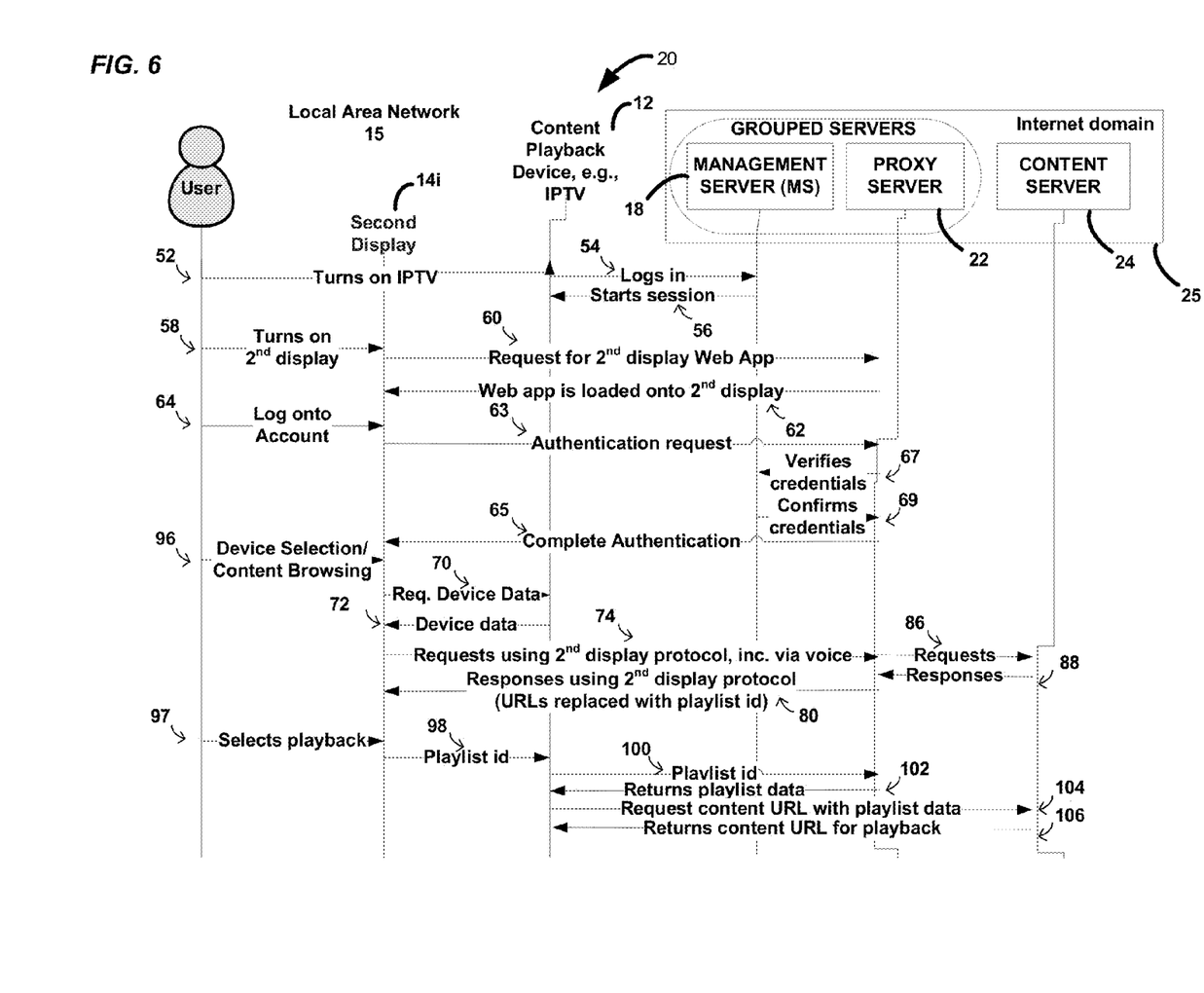
FIG. 6 is a sequence diagram illustrating a system and method according to an aspect of the present principles.

Referring to FIG. 6, an embodiment of a server 60 which may operate according to the principles described here is illustrated. The server may be, e.g., a proxy server, a management server, a backend server as described above, or the like. The steps performed by the memories within the proxy server 60 are described in greater detail above. The server 60 includes a processor 172. The server 60 further includes memory 174 bearing computer-readable instructions capable of establishing a user account session between the server and a second display. The server 60 further includes memory 176 bearing computer-readable instructions capable of receiving audio data from the second display. The memory 176 may further be capable of receiving audio data from other sources, including from a microphone connected directly to a content playback device. The server 60 further includes memory 178 bearing computer-readable instructions capable of converting received audio data to textual data. The server 60 further includes memory 182 bearing computer-readable instructions capable of performing a function with the textual data, e.g., searching on terms in the textual data, performing a command described by the textual data, or the like. The server 60 further includes memory 184 bearing computer-readable instructions capable of returning results to the second display based on the function performed, or in some cases to the content playback device. For example, the memory 184 may return search results to the second display. In another implementation, the memory 184 may return the results of a command provided by the user and performed by the server.

More general details of individual components are now described.

The content playback device 12 may be, e.g., an IPTV, a digital TV, a digital sound system, a digital entertainment system, a digital video recorder, a video disc player, a combination of these, or any number of other electronic devices addressable by a user on the local network 15. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, an audio device such as a microphone, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 15. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application for service provider and content selection, variations of which are described above. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown to undertake present principles. Further, the second display 14i can receive user input signals from various input devices including a point-and-click device such as a mouse, a keypad, a touchscreen, a remote control, an internal or external microphone, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/ or solid state storage. The servers communicate with a wide area network such as the internet 25 via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here includes a web application, but it will be understood that other types of applications may also be employed as described above. The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection, which navigation may be by way of voice input. Responsive to the selection, the second display 14*i* sends a command to the content playback device 12 to access and play back the selection, in which again voice input may be leveraged.

The command to play the local content item may be in a number of forms. The second display 14*i* may communicate to the proxy server 22 the request on behalf of the content playback device 12, and this request may be via the local network or via other means. Alternatively, the second display 14*i* may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14*i* is configured to address the content playback device 12 at a non-local level, e.g., at the server level, then the second display 14*i* may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the Internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

FIG. 6 is a sequence diagram illustrating an exemplary implementation of the system and method for enabling a user to employ a second display to browse content playback devices, service providers, content items and select the same for playback by a content playback device. FIG. 6 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14*i* and, e.g., instantiates a web browser session in which control may be exercised over the content playback device. A utility is executed on the second display 14*i*, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14*i* prompts the user to input to the second display 14*i* the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14*i* in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14*i*, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14*i*, using the local IP address returned as noted above, accesses the content playback device directly, in the sense of communicating through the local network. To select a particular content playback device, the second display 14*i* requests information about the content playback device 12 at state 70, including language information, digital rights management (DRM) information, etc., as desired, which information is returned from the content playback device to the second display 14*i* at state 72. Since the second display 14*i* knows the IP address of the content playback device 12 and consequently communicates directly with the content playback device 12, the second display 14*i* communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

The user may perform searches across one or more services using voice commands and voice entry of search terms, as described above. A user can input, using, e.g., a voice command to the second display, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80.

The content available for selection is presented on the second display so that the user can navigate in state 97 the display to enter a selection. Voice entry may also be employed to search for content and/or to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Note further that the control device may command the content playback device to play content by sending to the content playback device over the local network commands coded as if they were sent from an infrared remote control, specifically for example the commands may be in Sony Infrared Remote Control System (SIRCS) protocol. Such commands may be translated into such protocol following input and conversion from voice to text.

Systems and methods have been disclosed that allow improvement of the user experience of the IPTV without adding to the hardware costs of the unit. As disclosed above, users may employ voice input to perform searches and other functions and commands on components within a management server infrastructure. In so doing, users may control playback devices such as IPTVs directly from a second display.

Figure 7:
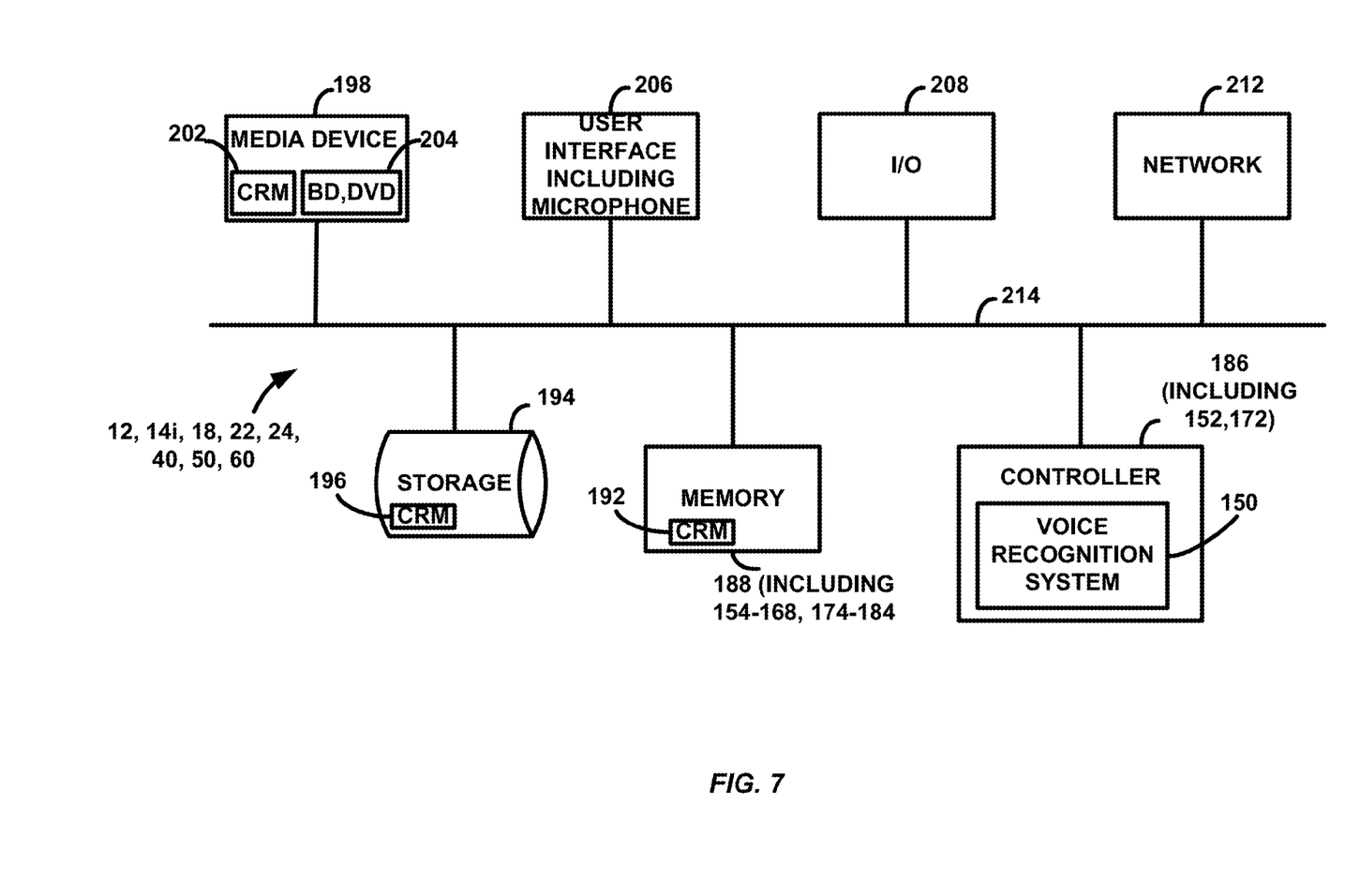
FIG. 7 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, e.g., that of the proxy server 22, management server 18, and content server 24, as well as for the backend servers 35. Referring to FIG. 7, a representation of an exemplary computing environment for a second display or for any of the servers is illustrated.

The computing environment includes a controller 186, a memory 188, storage 194, a media device 198, a user interface 206, an input/output (I/O) interface 208, and a network interface 212. The components are interconnected by a common bus 214. Alternatively, different connection configurations can be used, such as a star pattern with the controller at the center.

The controller 186 includes a programmable processor and controls the operation of the second display and servers and their components for the voice-entry and control system 150. The controller 186 loads instructions from the memory 188 or an embedded controller memory (not shown) and executes these instructions to control the system. In its execution, the controller 186 may provide the second display control of a content playback device system as, in part, a software system. Alternatively, this service can be implemented as separate modular components in the controller 186 or the second display.

Memory 188, which may include non-transitory computer-readable memory 192, stores data temporarily for use by the other components of the second display 14i, and the same may include memories 154-168 and 174-184 as discussed above. In one implementation, memory 188 is implemented as RAM. In other implementations, memory 188 also includes long-term or permanent memory, such as flash memory and/or ROM.

Storage 194, which may include non-transitory computer-readable memory 196, stores data temporarily or long-term for use by other components of the second display and servers, such as for storing data used by the system. In one implementation, storage 194 is a hard disc drive or a solid state drive.

The media device 198, which may include non-transitory computer-readable memory 202, receives removable media and reads and/or writes data to the inserted media. In one implementation, the media device 198 is an optical disc drive or disc burner, e.g., a writable Blu-Ray® disc drive 204.

The user interface 206 includes components for accepting user input, e.g., the content playback device registration information, from the user of the second display, and presenting information to the user. In one implementation, the user interface 206 includes a keyboard, a microphone a mouse, audio speakers, and a display. The controller 186, and especially the voice recognition system 150, uses input from the user to adjust the operation of the second display 14i and thus the subsequent servers.

The I/O interface 208 includes one or more I/O ports to connect to corresponding I/O devices, such as external storage or supplemental devices, e.g., a printer or a PDA. In one implementation, the ports of the I/O interface 208 include ports such as: USB ports, PCMCIA ports, serial ports, and/or parallel ports. In another implementation, the I/O interface 208 includes a wireless interface for wireless communication with external devices. These I/O interfaces may be employed to connect to one or more content playback devices.

The network interface 212 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention.

For example, the voice input and resulting voice commands can be used for operations other than searching, such as to control operation of the primary device for displaying or recording content. The voice input may be employed not just for commands or data entry, but also for identification of particular users, e.g., by comparison to stored voice profiles, so as to enforce viewing restrictions, track usage, and other purposes.

In other variations, for example, the application running on the second display may be a web application, a native application, a Java application, or any other sort of application that may work to establish a session with a server. The user may also search for and request content items to be played back that are resident within the local network, e.g., content stored on a DVR or Blu-Ray® player.

Moreover, while several implementations of the invention include that the user select a particular content playback device for playback, in some implementations a user may browse content with no content playback device selected at all. While the system and method have described implementations in which content playback devices have been selected before browsing and where little or no reference to content playback devices is made, other variations are possible. For example, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A method of performing a function relating to media content for playback on a content playback device using a second display device, comprising:
   i. establishing a session between a proxy server and a second display device, the session associated with a user account, the second display device further having at least one content playback device associated therewith, wherein an authentication process at the proxy server associates at least one content playback device with the second display device, and wherein the second display device is configured to control content playback on the at least one content playback device through the proxy server, which presents to one or more service providers an authentication credential of the content playback device;
   ii. receiving audio data at a server, the audio data indicating at least a portion of a function to be performed by the server;
   iii. converting the audio data to textual data;
   iv. using the textual data to perform the function; and
   v. transmitting a set of results of the performing of the function to the second display device or to the content playback device associated with the second display device.

2. The method of claim 1, wherein the function is a search function, and wherein the set of results includes search results.

3. The method of claim 1, wherein the converting is performed by a voice-to-text engine.

4. The method of claim 2, further comprising receiving a selection of a result from the set, and further comprising receiving an authentication credential established in the authentication process from the content playback device, and causing the playback of the selection on the content playback device.

5. The method of claim 4, further comprising affiliating the user account and content playback device with the service provider, the affiliating including transmitting to the service provider at least one user account identifier and the authentication credential.

6. The method of claim 5, further comprising affiliating the user account and content playback device with a plurality of service providers, the affiliating including transmitting to each of the service providers at least one user account identifier and the authentication credential, and wherein the using the textual data to perform the function includes using the textual data to perform a search on each of the service providers.

7. The method of claim 1, further comprising selecting the content playback device for browsing content items from a service provider through the proxy server.

8. The method of claim 1, wherein the content playback device is an IPTV, an audio system, or a digital video recorder.

9. The method of claim 1, wherein the second display is a tablet computer, a smart phone, a laptop computer, a desktop computer, an internet appliance, or a computing device with internet access.

10. The method of claim 1, wherein in the authentication process, the content playback device and the second display device each communicate with the proxy server to receive a token.

11. The method of claim 10, wherein the token is communicated in later transactions between the second display device and the proxy server.

12. A non-transitory computer-readable medium, comprising instructions for causing a computing device to implement the method of claim 1.

13. A method of performing a function relating to media content for playback on a content playback device using a second display device, comprising:
   i. establishing a session between a second display device and a server, the session associated with a user account, the second display device configured to control content playback on at least one content playback device through a proxy server, which presents to one or more service providers an authentication credential of the content playback device;
   ii. receiving audio data at the second display device, the audio data indicating at least a portion of a function to be performed by a server;
   iii. converting the audio data to textual data at the second display, the converting performed by a voice-to-text engine;
   iv. transmitting the textual data to the server; and
   v. receiving a set of results of the function at the second display device or at a content playback device associated with the second display device.

14. The method of claim 13, wherein the function is a search function, and wherein the set of results includes search results.

15. The method of claim 13, wherein the function is a command prompt, and wherein the set of results includes results of the command.

16. The method of claim 14, further comprising transmitting a selection of a result from the set to the server.

17. The method of claim 16, further comprising receiving at least a portion of a content item from a service provider corresponding to the result for playback on the second display device.

18. The method of claim 16, further comprising transmitting an authentication credential of the content playback device to the server or service provider, and receiving at least a portion of a content item corresponding to the result from the server or service provider for playback on the content playback device.

19. The method of claim 18, further comprising affiliating the user account and content playback device with a service provider, the affiliating including transmitting to the service provider at least one user account identifier and the authentication credential.

20. The method of claim 13, wherein the second display device is a smart phone, and wherein the receiving audio data at the second display device includes receiving audio data using an internal microphone of the smart phone.

21. The method of claim 13, wherein the second display device is a smart phone, and wherein the receiving audio data at the second display device includes receiving audio data using an external microphone in data communication with the smart phone.

22. A non-transitory computer-readable medium, comprising instructions for causing a computing device to implement the method of claim 13.

* * * * *